(12) United States Patent
Kloepfer (10) Patent No.: US 6,854,789 B2
(45) Date of Patent: Feb. 15, 2005

(54) TRUCK/TRAILER BOX CONSTRUCTIONS (75) Inventor: Michael Kloepfer, Ontario (CA)

(73) Assignee: Titan Trailers, Inc., Delhi (CA)

( * ) Notice: Subject to any disclaimer, the term of this patent is extended or adjusted under 35 U.S.C. 154(b) by 0 days.

(21) Appl. No.: 10/731,381

(22) Filed: Dec. 8, 2003

(65) Prior Publication Data
US 2004/0113458 A1 Jun. 17, 2004

Related U.S. Application Data (60) Division of application No. 10/127,057, filed on Apr. 19, 2002, now Pat. No. 6,688,673, which is a continuation-in-part of application No. 09/754,705, filed on Jan. 4, 2001, now Pat. No. 6,425,626.

(51) Int. Cl.[7] .............................................. B62D 33/02
(52) U.S. Cl. ............................. 296/183.2; 296/184.1; 296/183.1
(58) Field of Search ........................... 296/183.2, 186.1, 296/191, 184.1, 146.6, 182.1, 183.1; 298/22 AE; 52/80.1, 588.1; 29/401.1; 280/837

(56) References Cited

U.S. PATENT DOCUMENTS

| | | | | |
|---|---|---|---|---|
| 1,805,489 A | * | 5/1931 | Kerr et al. ................ 296/183.1 |
| 3,814,479 A | * | 6/1974 | Vornberger ............... 296/183.2 |
| 3,844,616 A | * | 10/1974 | Acker ....................... 296/183.2 |
| 3,883,148 A | * | 5/1975 | Miller ......................... 280/837 |
| 3,886,705 A | * | 6/1975 | Cornland ................... 52/588.1 |
| 4,194,767 A | * | 3/1980 | McCracken ............... 285/121.2 |
| 4,480,370 A | * | 11/1984 | Loevinger .................. 29/401.1 |
| 4,883,321 A | * | 11/1989 | Voigt ........................ 296/183.2 |
| 4,948,155 A | * | 8/1990 | Smith et al. ............. 298/22 AE |
| 5,322,350 A | * | 6/1994 | Hinson ...................... 296/184.1 |
| 5,326,156 A | * | 7/1994 | Heider et al. ............. 296/182.1 |
| 5,375,943 A | * | 12/1994 | McCavour et al. ........... 52/80.1 |
| 5,454,620 A | * | 10/1995 | Hill et al. ................. 296/183.2 |
| 5,460,431 A | * | 10/1995 | McWilliams ............. 298/22 AE |
| 5,536,060 A | * | 7/1996 | Rashid et al. ............. 296/146.6 |
| RE35,580 E | * | 8/1997 | Heider et al. ............. 296/183.2 |
| 5,664,826 A | * | 9/1997 | Wilkens ................... 296/186.1 |
| 5,681,095 A | * | 10/1997 | Martin ........................ 296/191 |
| 6,109,684 A | * | 8/2000 | Reitnouer ................. 296/184.1 |
| 6,142,496 A | * | 11/2000 | Bartel ....................... 296/184.4 |
| 6,637,808 B1 | * | 10/2003 | Ling et al. ................ 296/183.2 |
| 6,669,271 B2 | * | 12/2003 | Booher ........................ 296/191 |
| 6,719,360 B1 | * | 4/2004 | Backs ....................... 296/186.1 |

\* cited by examiner

Primary Examiner—Kiran Patel
(74) Attorney, Agent, or Firm—Delbert J Barnard

(57) ABSTRACT

A wall structure of a trailer box (10) is constructed from a plurality of panels (36, 38, 40) which are welded together where their edges meet. The panels (36, 38, 40) are each extrusions and each includes thin side skins (42, 44) and thin webs (46, 48, 50). The edge regions that are connected together include thickened portions that dissipate a substantial amount of the heat provided by the welds (56, 58). A plurality of panels (36, 38, 40) are welded together to form a large wall structure (WS). This wall structure (WS) is then reconfigured by a roll-forming machine (FIGS. 8–10) to provide a box (10) having a longitudinally straight and laterally curved configuration. Laterally considered, the box (10) has a concave inner side and a convex outer side. This shape of the box provides the box with both sidewalls and a bottom. The overall construction of the trailer box is lightweight and quite strong and facilitates construction of the truck/trailer box.

6 Claims, 8 Drawing Sheets

TRUCK/TRAILER BOX CONSTRUCTIONS

RELATED APPLICATION

This application is a divisional of U.S. Ser. No. 10/127,057, filed Apr. 19, 2002 now U.S. Pat. No. 6,688,673, and entitled Truck/Trailer Box Constructions.

This application is a continuation-in-part of my application Ser. No. 09/754,705, filed Jan. 4, 2001 now U.S. Pat. No. 6,425,626, and entitled TRUCK/TRAILER BOX CONSTRUCTIONS.

TECHNICAL FIELD

This invention relates generally to a truck/trailer box construction having a sidewall structure that is longitudinally straight and laterally curved, and having a concave inside shape and a convex outside shape. More particularly, it relates to the provision of such a sidewall structure that is formed from spaced apart inner and outer skins and longitudinally spaced apart webs that extend between and interconnect the two skins. It also relates to a method of making the sidewall structure and a truck/trailer box utilizing the sidewall structure.

BACKGROUND OF THE INVENTION

Known truck/trailer boxes that are longitudinally straight and laterally curved, and which have a concave upper side and a convex lower side, are shown by the following United States Patents: U.S. Pat. No. 1,805,489, granted May 19, 1931, to Arthur G. Kerr and Daniel Merchant; U.S. Pat. No. 3,844,616, granted Oct. 29, 1974, to Douglas B. Acre; U.S. Pat. No. 4,948,155, granted Aug. 14, 1990, to Fred T. Smith and Fred P. Smith; U.S. Pat. No. 5,090,773, granted Feb. 25, 1992, to Bernard Guillsume; and U.S. Pat. No. 5,482,359, granted Jan. 9, 1996, to Albert A. Goodson. These patents should be carefully considered for the purpose of putting the present invention into proper prospective relative to the prior art.

There is a need for a way of constructing the sidewalls of the truck/trailer boxes from materials that are very lightweight but yet are strong and rigid. There is also a need for such a truck/trailer box construction that permits the sidewall to be built in sections that can be welded together while allowing for the use of very thin skins and webs that are themselves too thin to be welded. A principal object of the present invention is to fulfill these needs.

BRIEF SUMMARY OF THE INVENTION

A truck/trailer box construction of the present invention comprises a longitudinally straight sidewall structure having a laterally concave inside shape and a laterally convex outside shape. The sidewall structure comprises spaced apart inner and outer skins and longitudinally spaced apart webs, extending between and interconnecting the two skins. In preferred form, the sidewall structure is formed from a series of panels that are welded together at edges where they meet. Preferably, the upper and lower skins and the webs are constructed from an aluminum alloy material, or the like, and are formed by extrusion.

The method of the present invention is basically characterized by providing a sidewall panel structure that includes an upper skin, a lower skin and a plurality of parallel, longitudinally spaced apart, webs, which extend between and interconnect the skins. This sidewall panel structure is roll formed to give it a longitudinally straight and transversely curved shape. To do this, a plurality of forming rolls are provided in a cluster. Adjacent rolls form nips for receiving the panel structure. The panel structure is fed into the nips, with their webs disposed substantially perpendicular to the axis of the rolls. The sidewall panel structure is fed through the rolls several times in order to bend the wall structure a small amount each run through.

The present invention provides a truck/trailer box construction in which the floor and the sides of the box are created without a seam or a weld joint connecting them together. A plurality of long extrusions are used to create the floor and the sides of the box. The extrusions are welded together at their edges to form a single large panel structure that is then transformed by roll forming into a substantially semi cylindrical shape. The resulting box structure preferably has substantially flat upper side portions that extend the full length of the box above the portion of the panel structure that is roll formed. Herein the structure that is formed by welding a plurality of elongated panels together is referred to as sidewall structure even though it also forms a bottom for the box when it is reconfigured by roll forming.

The present invention also permits the elimination of longitudinal supports or stiffeners for the panels that are normally a part of the prior art boxes, which have rounded bottom. The longitudinal supports and/or stiffeners are not needed because the sidewall structure is stiffened by the skins and the webs that extend between and interconnect the skins. The webs are in effect ribs inside the sidewall structure and they are sufficient to provide the strength and stiffening that the sidewall structure needs.

The present invention includes constructing a truck/trailer box from panels of aluminum extrusions and welding the panels together in a way that minimizes loss of strength caused by heat from the welds. In the panel and joint construction of the invention, a substantial part of the heat dissipates in two webs that meet at the joint and in thickened corner regions formed where the webs meet the skins of the panels. The dissipation of the heat from the weld in these regions minimize heat dissipation in the skins of the panel away from the joints where strength is needed.

Other objects, advantages and features of the invention will become apparent from the description of the best mode that is set forth below, from the drawings, from the claims and from the principals that are embodied in the specific structures that are illustrated and described.

BRIEF DESCRIPTION OF THE SEVERAL VIEWS OF THE DRAWING

Like reference numerals are used to designate like parts throughout the several views of the drawing, and.

DETAILED DESCRIPTION OF THE INVENTION

Figure 1:
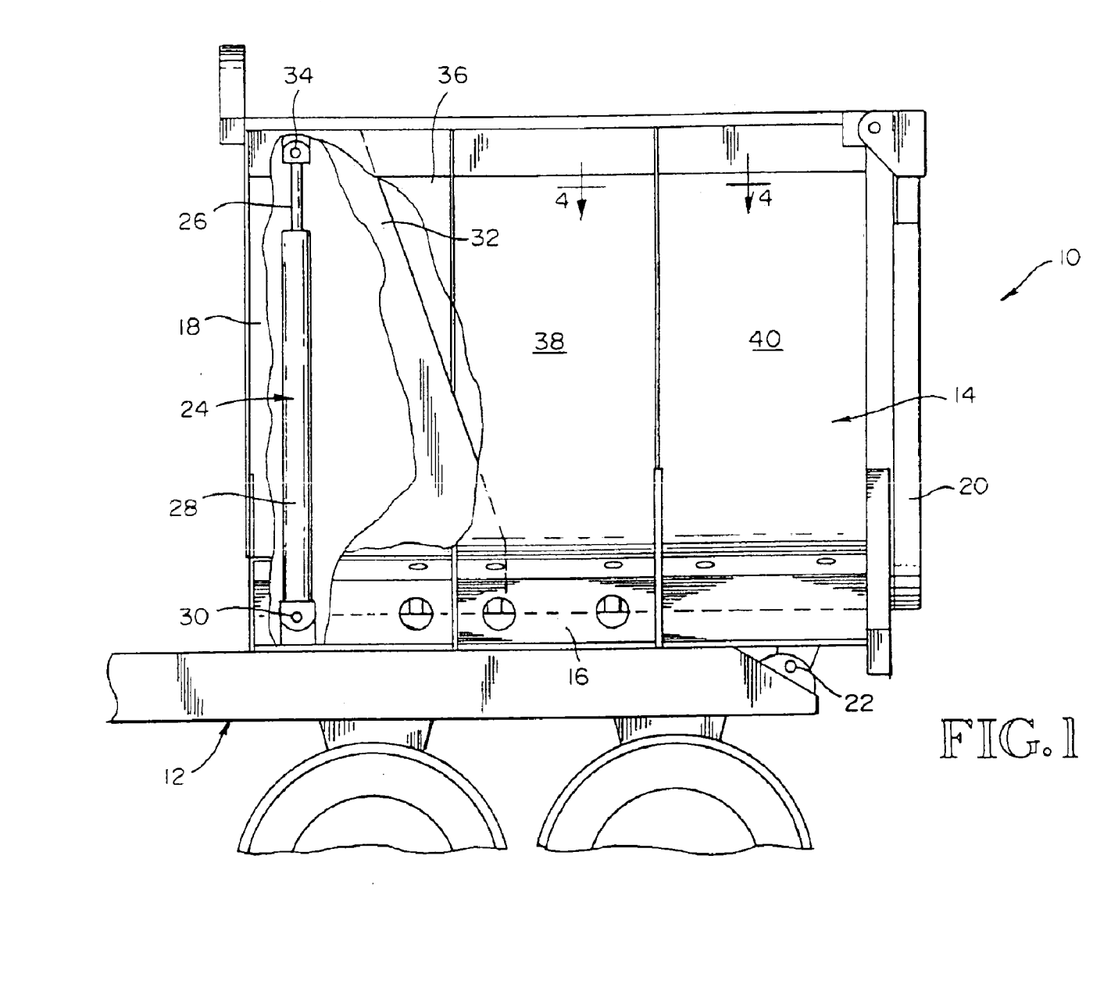
FIG. 1 is a fragmentary side elevational view of one embodiment of the invention, such view showing foreground portions of the truck/trailer box, and a housing within the box, both cut away for the purpose of showing a portion of a cylinder that is provided for raising and lowering the box relative to the truck/trailer frame.
Figure 3:
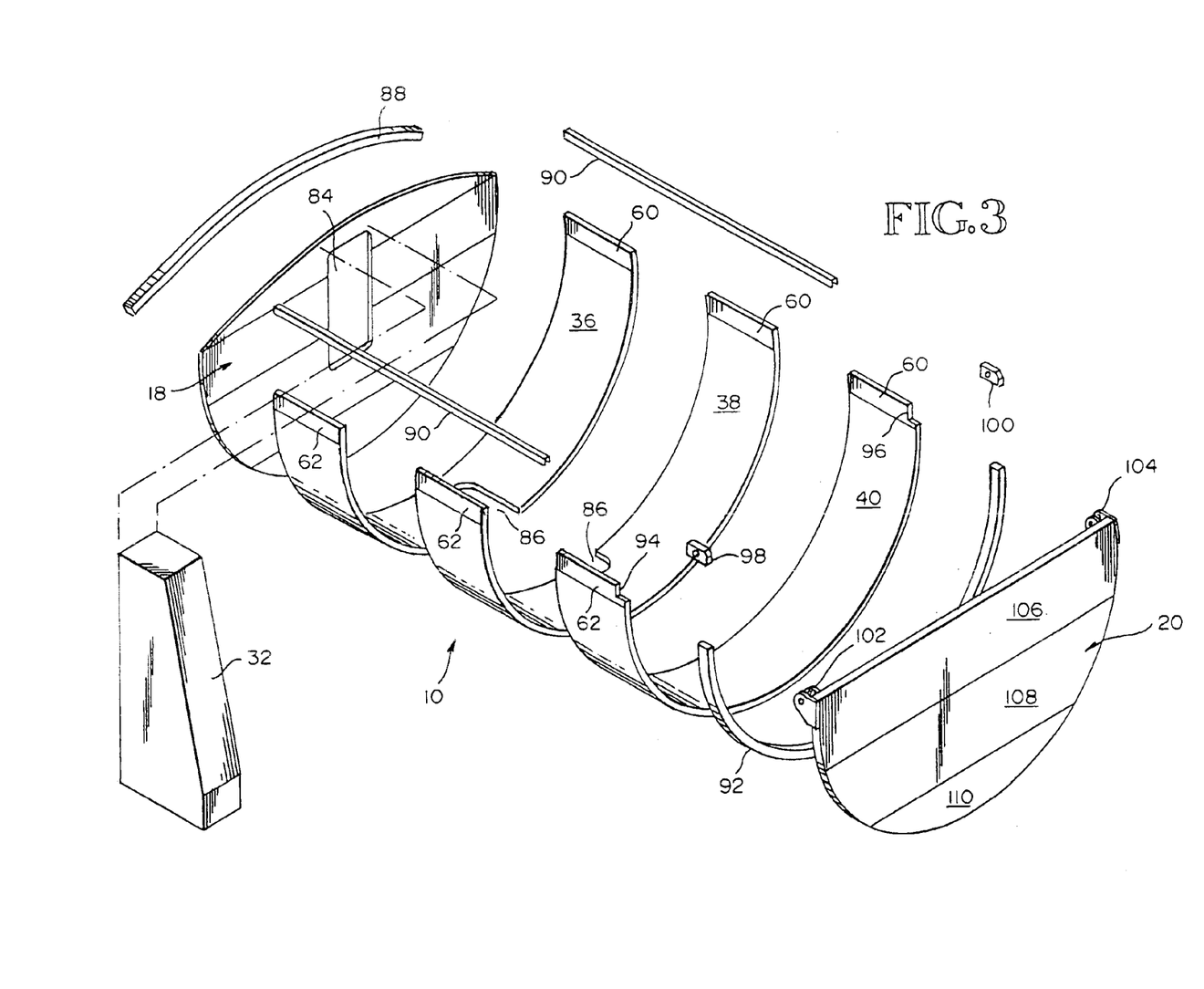
FIG. 3 is an exploded pictorial view of the truck/trailer box shown by FIGS. 1 and 2.

FIG. 1 shows a truck/trailer box 10 mounted on a truck/trailer chassis 12. Box 10 includes a sidewall structure 14, a base frame 16, a front wall 18, and a rear door 20. The base frame 16 is hinge connected at 22 to the chassis frame 12. A hydraulic cylinder 24 is pin connected at its lower end to the chassis frame 12 and at its upper end to the box 10. It serves to raise and lower the box 10 relative to the chassis frame 12. Cylinder 24 is shown in a retracted position in FIG. 1. It includes a piston component 26 and a cylinder component 28. The base in the cylinder component 28 is connected to the frame structure 12 by a pivot pin 30. The upper end of the piston rod component is connected to a housing 32 by a pivot pin 34. The inner housing 32 is provided to receive the cylinder 24. In FIG. 3, housing 32 is shown outside of the sidewall structure 14.

FIG. 1 shows the cylinder 24 retracted and the box 10 resting on the chassis frame 12. When cylinder 24 is extended, the piston rod component 26 moves upwardly out of the cylinder component 38 and pushes up on the upper forward end portion of the box 10. This causes the box 10 to swing upwardly about pivot pin 22 into a rearward tilting position.

Referring to FIG. 3, the first embodiment has a sidewall structure 14 that is constructed from three panels 36, 38, 40. Each panel 36, 38, 40 includes an inner skin 42, an outer skin 44 and a plurality of webs 46, 48, 50. A typical panel has one web 48, one web 50 and twelve webs 46. Panels 36, 38, 40 are formed by extrusion. The webs 46, 48, 50 extend longitudinally of the panels 36, 38, 40 when the panels 36, 38, 40 are still flat and straight. Preferably, the flat panels 36, 38, 40 are brought together at their edges. The web 48 on panel 36 is mated with the web 50 on panel 38. In similar fashion, the web 48 on panel 38 is mated with the web 50 on panel 40. The webs 50 include longitudinal tongues 52 that fit inside of longitudinal grooves 54 formed in the webs 48. The outside corner regions of webs 48, 50 are beveled [FIG. 4] and when a web 48 is mated with a web 50, a v-groove is provided by the bevels on both the inside 42 and the outside 44 of the two panels being joined. Following mating of each web 48 with a web 50, the v-groove are welded, so as to form filet welds 56 on the inside of the panels and filet welds 58 on the outside of the panels. The welds 56, 58 and the cross sectional configuration of the webs 48, 50 provide a sectional shape at the joints that bares similarity to an 120 beam. Each such I-beam region is an integral part of the joint and hence is an integral part of the sidewall structure. The panel and joint construction used in the wall structure of the present invention is essentially like the panel and wall construction disclosed in the aforementioned co-pending application Ser. No. 09/754,705. The contents of that application are hereby incorporated in the application by this specific reference, under the doctrine of incorporation by reference.

Figure 8:
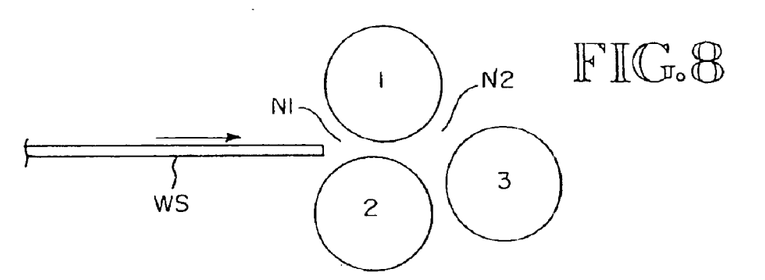
FIG. 8 is an end view showing a thin skinned, hollow core panel, positioned to enter into the forming rolls of a roll forming machine.
Figure 9:
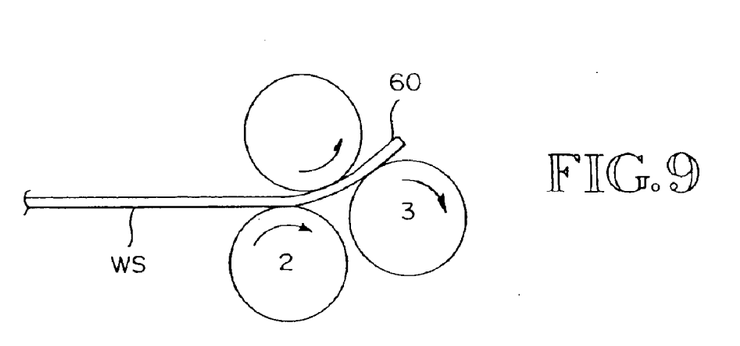
FIG. 9 is a view like FIG. 8, but showing the panel in the process of being bent by the forming rolls.
Figure 10:
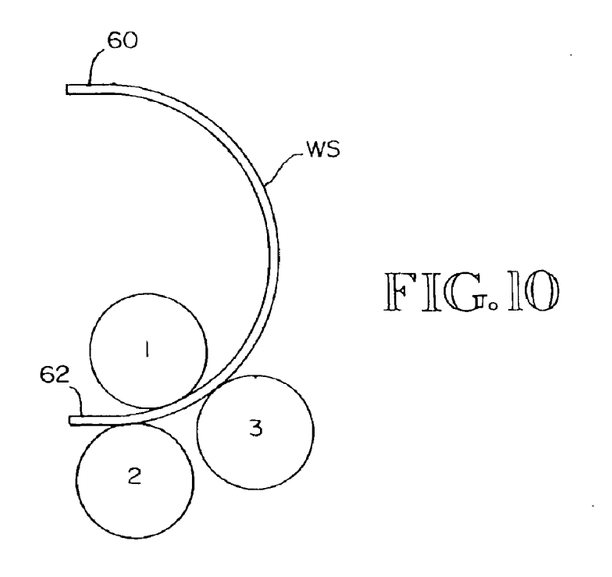
FIG. 10 is a view like FIGS. 8 and 10, but showing a final stage of roll forming the panel to form the sidewall of the truck/trailer box.
Figure 11:
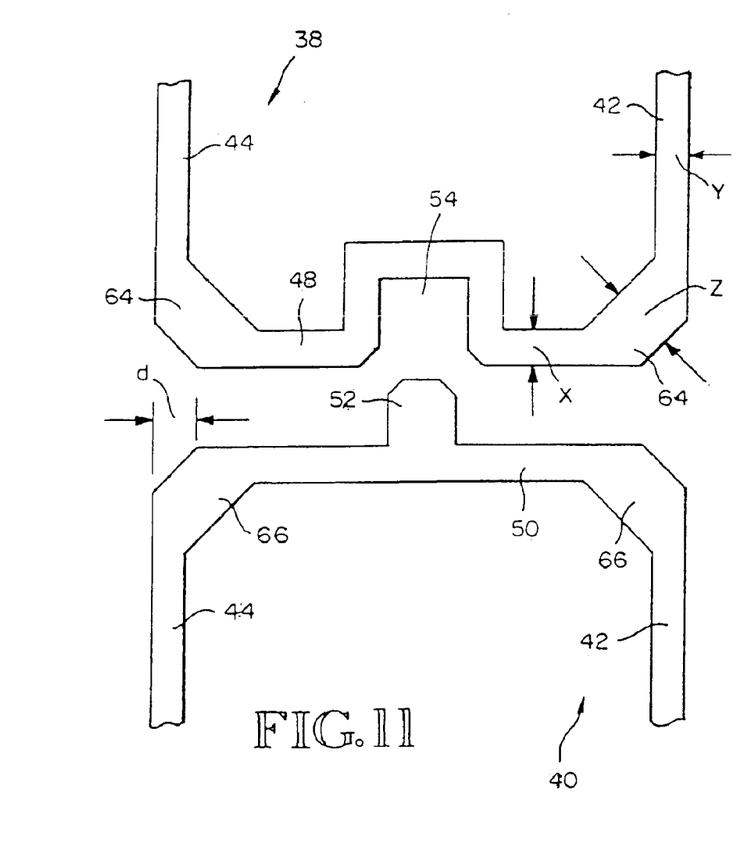
FIG. 11 is an enlarged scale end elevational view showing confronting edges of adjacent extrusions spaced from each other.

When the panels 36, 38, 40 are joined and welded together, they form a sidewall structure that is flat. This structure is as long as the combined widths of the panels 36, 38, 40 and is as wide as the common length of the panels 36, 38, 40. After the panels 36, 38, 40 are welded together, to form a unitary structure composed of a skin on 35 each side and a plurality of webs interconnecting the skins, the wall structure is roll formed into a shape that is close to being semi cylindrical. By way of typical and therefore non-limitive example, the roll forming can be done by use of a standard plate roller, for example, such as are made by The Webb Corporation having a business address of 402 East Broadway, Webb City, Mo. 64870. FIGS. 8–10 are end views of a Webb three roll bending machine. This equipment comprises rolls 1, 2, 3. FIG. 8 shows the wall structure WS being moved towards a nip that is formed by and between rolls 1 and 2. A second nip is formed by and between rolls 1 and 3. The wall structure WS is oriented with the webs 46, 48, 50 perpendicular to the axes of rotation of the rolls 1, 2, 3. Thus, the bending that is done bends both the skins 42, 44 and the webs 46, 48, 50. Referring to FIG. 9, the rolls 1 and 2 move the wall structure WS into contact with the roll 3. Bending does not commence immediately and so the leading portion of the wall structure WS, designated 60, remains flat. The amount of curvature caused by each run through of the wall structure WS can be changed by vertical movement of the roll 3. Roll 3 is positioned so that the wall structure WS is bent only a small amount each time it is passed through the forming equipment. The first pass through the rolls 1, 2, 3 puts a small amount of curvature in the wall structure WS. Prior to each additional pass through the equipment, the roll 3 is moved higher so that it will put an additional small amount of bend into the wall structure WS. Thus, the wall structure WS is moved through the rollers 1, 2, 3 several times until the desired radius of curvature is achieved. Each time, care is used to not bend the leading and trailing portions 60, 62. This provides a flat portion in the upper sidewall regions of the box 10. If an attempt had been made to bend the wall structure WS the full amount in one pass, the webs 46, 48, 50 would most likely collapse. However, it was found that the webs 46, 48, 50 can be bent along with the skins 42, 44 if multiple passes are used and a small amount of bending is done per each pass.

FIG. 3 shows the panels 56, 38, 40 spaced apart while they are in a bent condition. This has been done for the purpose of making it easier to see the construction of the box 10. However, as described above, the panels 36, 38, 40 are welded together while in a flat condition. Then, the combined structures 36, 38, 40 (wall structure WS above) is roll formed into the desired shape. This shape is substantially semi cylindrical but with upper side portions 60, 62 that are substantially flat.

The panel sections 36, 38, 40 are connected together by weld beads 56, 58, one on each side of the structure. By way of example, the thickness dimension T for the panel sections 36, 38, 40, may be substantially about 1½ inches. The skins 42, 44 and webs 46, 48, 50 may be substantially about 0.09 inches thick. The center-to-center dimension between adjacent webs 46, 48, 50 may be substantially about 1.763 inches. An important dimension is the thickness Z in the region of the welds 56, 58. In the example, this thickness is substantially about 0.188 inches. The weld recess width W is substantially about 0.250 inches. The weld recess depth D is substantially about 0.125 inches.

Figure 12:
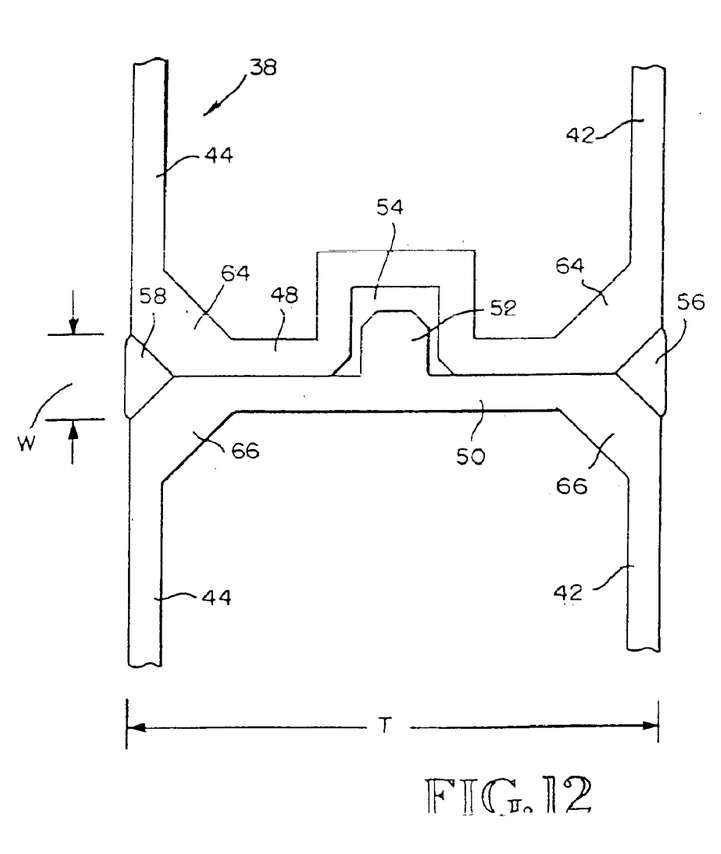
FIG. 12 is a view like FIG. 11, but showing the two edges of the extrusions together and further showing welds connecting the extrusions together where they meet.

In preferred construction, the edge walls or webs 48 are formed to include a longitudinally extending groove 54. The edge walls or webs 50 are provided with a complementary longitudinally extending tongue 52. As shown by FIG. 12, the tongue 52 makes a loose fit with the groove 54. In the given example, the tongue width may be substantially about 0.1875 inches. The groove width may be substantially about 0.25 inches. The tongue length may be about 0.1825 inches. The groove depth may be substantially about 0.2475 inches. During assembly, two panel sections to be joined are brought together. The tongue 52 on one is inserted into the groove 54 in the other. Then, the side planes of the two panel sections are put into substantial coplanar alignment and the weld beads 56, 58 are placed within the weld recesses. The tongue and groove components facilitate the welding process. If they were not present when the panels were welded together, the panels would expand and contract and become "wavy" down the length of the side. This would make it impossible to weld properly. It would be possible to "tack" weld every twelve inches on one side, but this would be impractical. The invention includes any type of tongue and groove system that holds the panels parallel to each other for welding purposes. For example, a two tongue and two groove system could be used.

At each joint, the diagonal corner regions 64, 66 provide both structural reinforcement and width and depth for the weld beads 56, 58. A weld bead 56, 58 that is substantially triangular in cross section, substantially about 0.250 inches wide, and substantially about 0.125 inches deep is made possible because of the thickness of the material in regions 64, 66. The corner regions 64, 66 and the weld beads 56, 50 together form outwardly widening flanges that, together with the wall sections 48, 50 provide a reinforcing beam section at the location of each joint. This beam section extends the full length of the joint and its parts 48, 50, 64, 66 in effect form I-beam like longitudinal stiffening and strengthening ribs at each joint location.

The panels 36, 38, 40 that make up a sidewall are preferably laid flat on a jig. They are then clamped and tack welded about every four feet on the underneath side. They are no tack welds on the top. Then, all panels are welded the full length of the wall, simultaneously. The wall forming panel assembly is then flipped over to position its welded side facing downwardly. The wall structure is then clamped down and the new "up" side is welded the full length, simultaneously. As can be seen, there is no weld seams created that extend from one side of the wall structure to the other. There is no need for longitudinal structural members for strengthening the wall structure. The wall structure itself makes this unnecessary.

Figure 2:
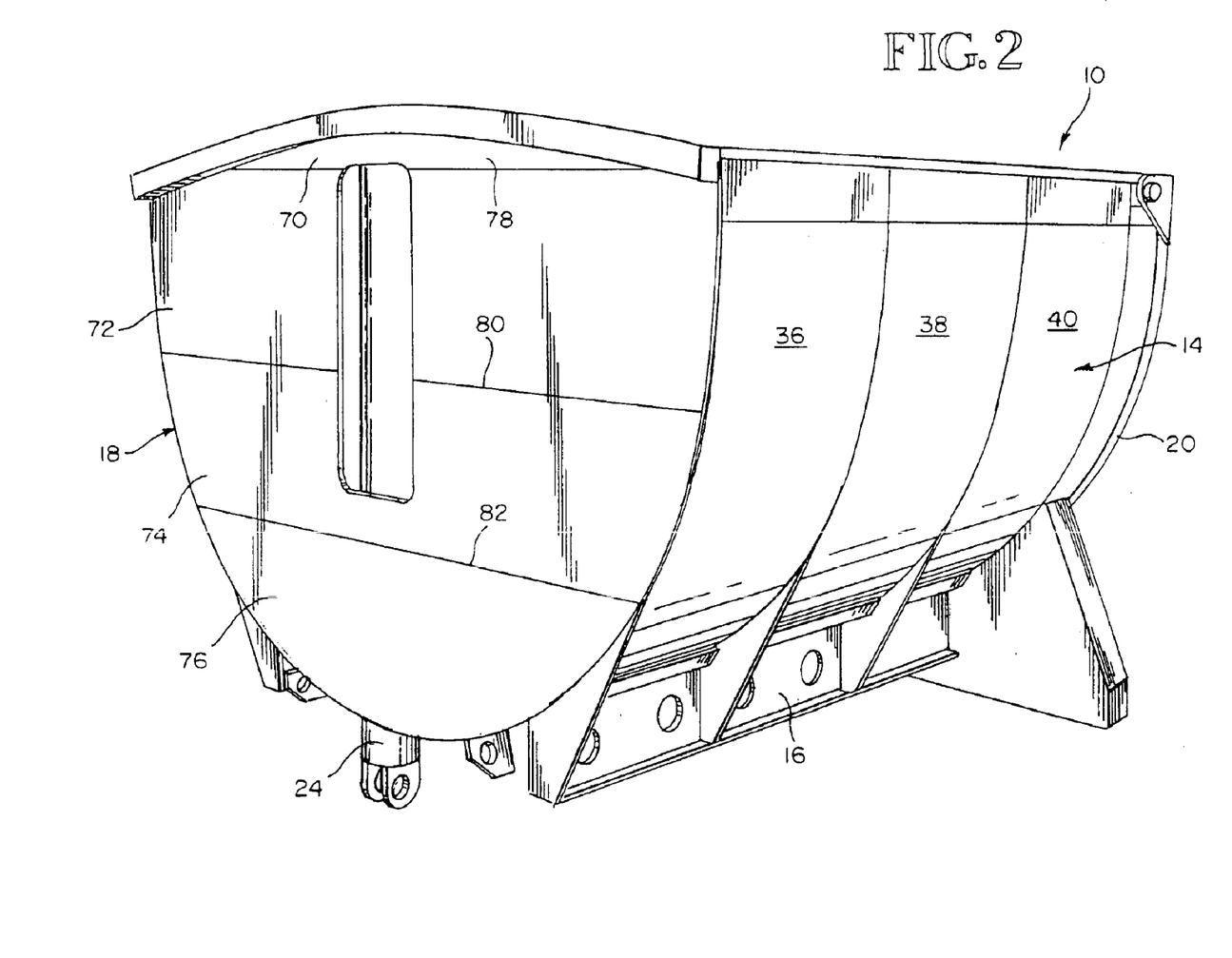
FIG. 2 is a pictorial view of the truck/trailer box shown by FIG. 1, such view looking towards the front and one side of the box.

The front wall 18 is preferably also made from panels that are composed of skins 42, 44 that are held spaced apart and are connected together by webs 46, 48, 50. Referring to FIG. 2, the front wall 18 is shown, for example, to be formed from panels 70, 72, 74, 76. Joints 78, 80, 82 are formed where the panels 70, 72, 74, 76 meet. These joints 78, 80, 82, are preferably like the joints shown in FIG. 4, and are composed of edge webs, tongue-and-groove members, V-grooves for the welds, and weld beads in the V-grooves.

The cylinder housing 32 is formed of sheet metal panels that are welded together. Then, the housing 32 is placed within the box 10 and is welded at its bottom edges to the panel 36 and at its rear edges to the wall 18. An access window 84 is provided in the wall 18, to provide access into the cylinder housing 32.

A bottom opening 86 is provided in one or both of the panels 36, 38 to accommodate the lower portion of the cylinder 24 as it extends through the bottom of the box 10 to an anchor location on the frame 12 below the box 10. The upper edge or front wall 18 is preferably provided with a cap 88. In similar fashion, on the opposite sides of the box 10, caps 90 are connected to the upper edges of the sidewall portions 60, 62. The caps 10 keep dirt and water out of the extrusions. They are not provided for strengthening the body. The strength of the rolled extrusions eliminates the need for a top rail that provides extra strength. An end cap 92 is preferably connected to the rear edge of the panel 40, to reinforce the rear edge and provide a stop for the door 20. Members 86, 92 may be made from tubular stock while the members 90 are made from channel stock. The upper edge portions are received within a channel space in the members 90.

In FIG. 3, the upper rear corner regions of the panel 40 are shown to be notched at 94, 96. Pin plates 98, 100 are received within the notches 94, 96 and are welded to the panel 40. Pin plates 98, 100 are a part of a pair of knuckle hinges which further include apertured plate pairs 104, 106 at the upper corners of the door 20. Plates 98, 100 extend between the two plates of each pair 102, 104 and pivot pins are inserted through the three plates at each ends location to complete the hinge structure.

Door 20 is preferably also constructed from panels 106, 100, 110 that are welded together where they meet.

Figures 4, 5:
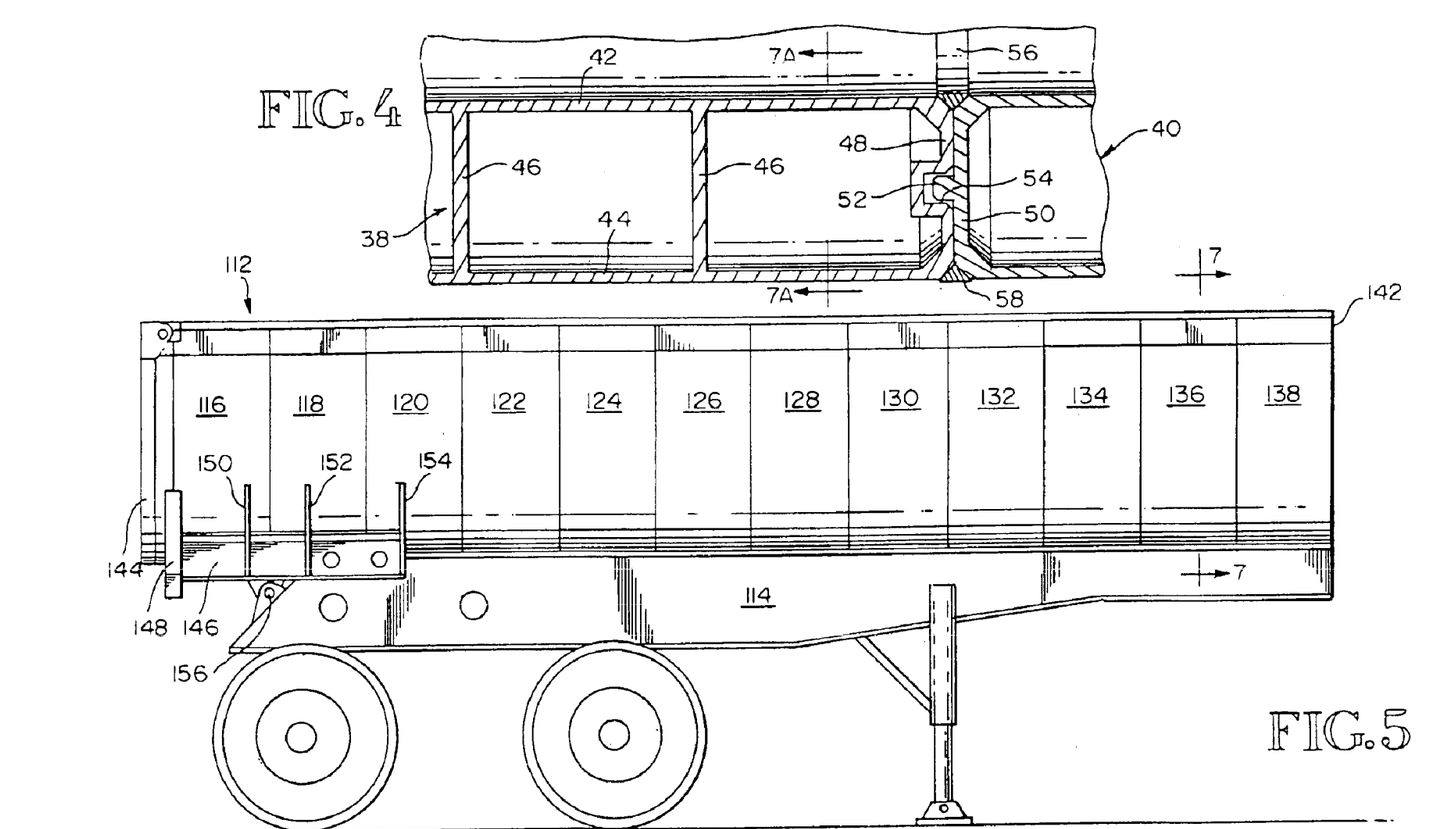
FIG. 4 is a fragmentary sectional view taken substantially along line 4—4 FIG. 1.
FIG. 5 is a side elevation view of a second embodiment of the invention.
Figure 6:
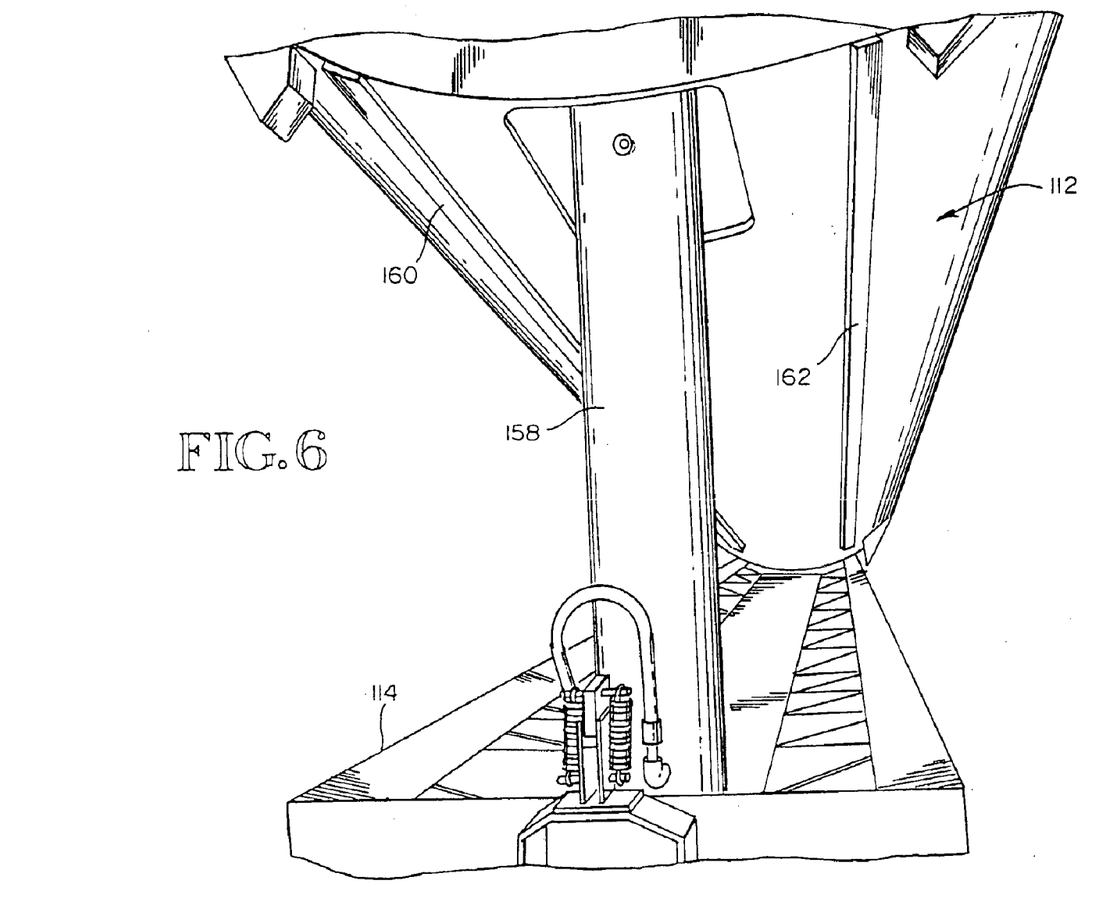
FIG. 6 is a fragmentary pictorial view showing the lifting cylinder being used to tilt the truck/trailer box upwardly from a truck/trailer frame.

FIGS. 5 and 6 relate to a larger box 112 mounted on a trailer chassis 114. The box 112 is composed of sections 116–138, constructed and connected together in the manner described above in connection with the first embodiment. These side portions of the box 112 include substantially flat upper portions and a cap structure 140. The front end of the box 112 includes an end wall 142. A door 144 is provided at the rear of the box 112. The three adjacent sections 116, 118, 120 at the rear of the box 112 are connected at their bottoms to a frame 146. This frame 146 is reinforced by gussets 148, 150, 152, 154 and it is hinge connected at 156 to the frame 114. As shown by FIG. 6, a tipping cylinder 158 is provided at the front end of the box 112 and the front end of the frame 114. A pair of bottom rails 160, 162 are provided at laterally spaced apart locations on the bottom of the box 112. These rails 160, 162 make contact with the chassis frame 114 when the box 112 is supported by the chassis frame 114. The rails may comprise generally C shaped extrusions which receive elastimeric bumper strips. The elastimeric strips are receive in the extrusions. It is the elastimeric strips that make contact and prevent the aluminum from rubbing on the frame. The elastimeric strips also function as shock absorbers between the frame and the aluminum. The extrusions and the elastimeric strips do not function to reenforce the aluminum body structure. As previously stated, longitudinal supports and/or stiffeners are not needed because the side wall structure is stiffened by the skins and the webs that extend between and interconnect the skins.

Figures 7, 7A:
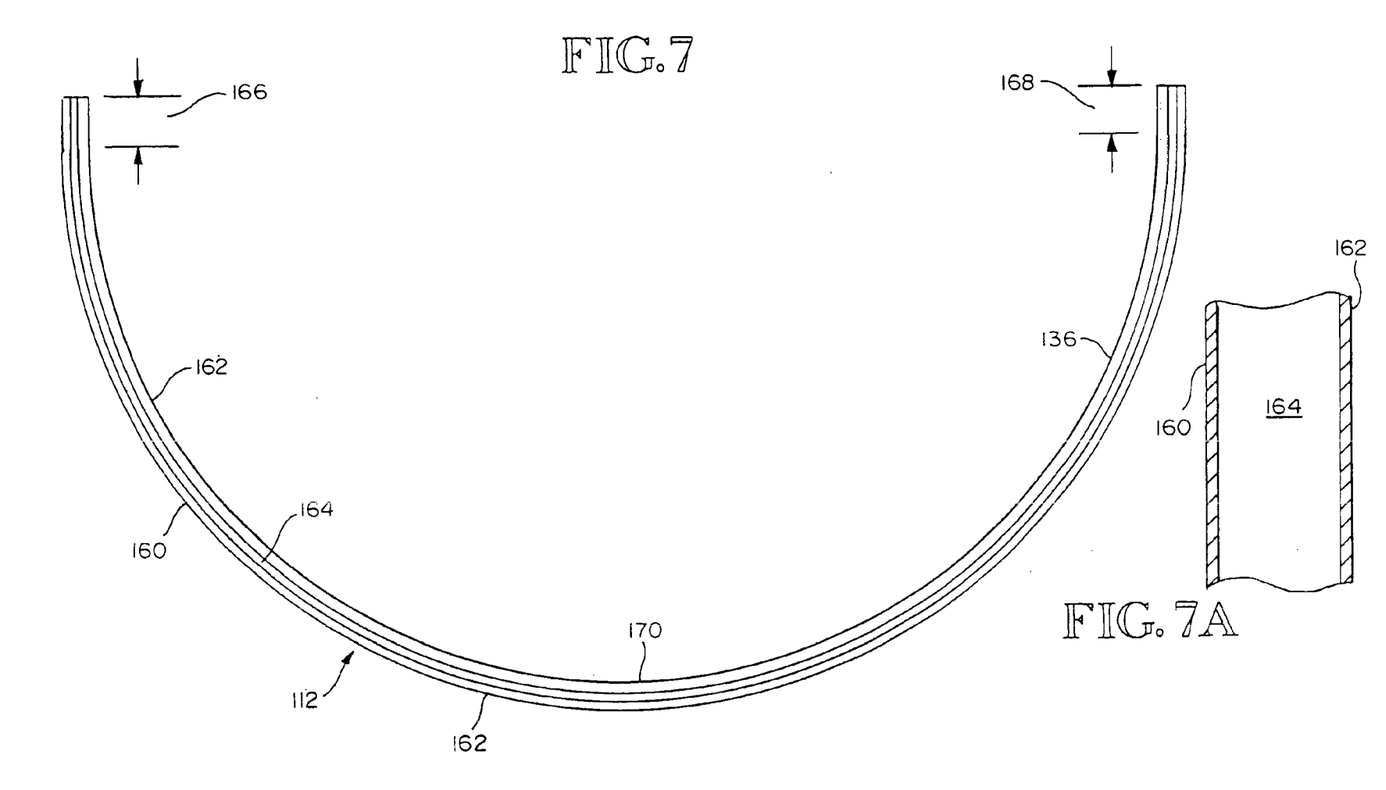
FIG. 7 is a transverse sectional view taken substantially along line 7—7 of FIG. 5, but with the truck/trailer frame omitted.
FIG. 7A is an enlarged scale sectional view taken substantially along line 7A—7A of FIG. 4.

FIG. 7 is a sectional view taken through the section 136 of the box 112, substantially along line 7—7 of FIG. 5. It shows the thickness of the skins 160, 162 on an exaggerated scale relative to the web width 164. FIG. 7A is an enlarged scale of a portion of FIG. 7 that presents the parts 160, 162, 164 in a more realistic scale. Typical dimensions of the parts are stated above in the description of the first embodiment. FIG. 7 shows upper side regions 166, 168 of the box 112 which are substantially flat. That is, the box structure 112 is substantially straight both vertically and horizontally in regions 166, 168. Below regions 166, 168, the wall structure forming the box 112 has been roll formed to give it a concave inner side 170 and a convex outer side 172. Herein, the reference to the box structure being longitudinally straight and laterally curved applies even though the curvature stops below the upper sections 166, 168. The wall structure is predominantly curved in the lateral direction because it has a concave inner side and a convex outer side even though the substantially flat sections 166, 168 are present.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather are to be determined by the following claims, interpreted according to accepted doctrines of patent claim interpretation, including use of the doctrine of equivalents and reversal of parts.

What is claimed is:

1. A method of constructing a truck/trailer box, comprising;

providing a sidewall panel structure that includes an inner skin, an outer skin and a plurality of transverse webs that are longitudinally spaced apart, are parallel, and which extend between and interconnect the skins; and roll forming the sidewall panel structure to give it a longitudinally straight and a transversally curved shape, concave upper side and a convex lower side, including;

providing a plurality of forming rolls having parallel axis, with adjacent rolls forming nips; and feeding the sidewall panel structure into the nips, with the webs of the panel extending perpendicular to the axis of rotation of the forming roll, and rotating the forming rolls.

2. The method of claim 1, wherein the inner and outer skins and the webs are constructed from an aluminum alloy.

3. The method of claim 1, comprising making a truck/trailer sidewall structure from a plurality of flat panels having transverse edges that meet, and welding the panels together at said edges to form the sidewall structure and then roll forming said structure.

4. The method of claim 3, comprising making the panels by extrusion.

5. The method of claim 1, comprising providing a plurality of sidewall panels, welding the panels together to form the sidewall panel structure, and then roll forming the sidewall panel structure to give it its transversely curved shape.

6. The method of claim 1, further comprising controlling movement of the sidewall panel structure through the forming rolls so that the formed structure has upper opposite side portions which are flat.

* * * * *